United States Patent Office 2,969,371
Patented Jan. 24, 1961

2,969,371

SUBSTITUTED INDENO [1,2-c] PYRAZOLE DERIVATIVES

Robert A. Braun and William A. Mosher, Newark, Del. (Both of 1530 Spring Garden St., Philadelphia, Pa.)

No Drawing. Filed Feb. 3, 1959, Ser. No. 790,823

14 Claims. (Cl. 260—310)

This invention relates to a novel series of indeno-(1,2-c)pyrazol-4-one hydrazone derivatives as well as to intermediates and processes for preparing them.

More specifically, this invention relates to 3-substituted indeno(1,2-c)pyrazol-4-ones having utility in the animal organism as pharmacodynamic agents such as central nervous system depressants, anti-Parkinson agents and hypotensive agents. Particularly outstanding is their activity as tranquilizers and ataractics. Furthermore these compounds have been found to have a different mechanism of action than previously known depressants.

This novel series of compounds is represented by the following structural formula:

FORMULA I

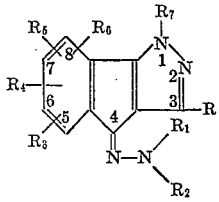

wherein

R is alkyl or alkenyl of 1 to, and including, 8 carbon atoms, aralkyl of 7 to 8 carbon atoms such as benzyl or phenethyl, phenyl or substituted phenyl of a carbon content of 6 to 8 carbon atoms such as aminophenyl, halophenyl, lower alkyl phenyl or lower alkoxy phenyl.

$R_1$ and $R_2$ are hydrogen, lower alkyl or, taken together, phenyl and hydrogen. Otherwise stated the moiety

taken as a whole may represent a dialkylamino, alkylamino, monophenylamino or preferably amino moiety.

$R_3$, $R_4$, $R_5$ and $R_6$ are hydrogen, hydroxy, lower alkyl, amino, halogen, lower alkoxy or nitro.

$R_7$ is hydrogen, alkyl of 1 to 8 carbon atoms, aralkyl of 7 to 8 carbon atoms such as benzyl or phenethyl, or acyl of less than 9 carbon atoms such as benzenesulfonyl, benzoyl, lower alkanoyl, for instance acetyl or propionyl, alkyloxycarbonyl such as carbethoxy or carbomethoxy.

Preferred compounds of this invention are those of Formula I in which $R_4$, $R_5$, and $R_6$ and $R_7$ are hydrogen.

Preferred and advantageous compounds are those of Formula I in which $R_1$, $R_2$, $R_3$, $R_4$, $R_5$, $R_6$ and $R_7$ are hydrogen and R is alkyl of 1 to 8 carbon atoms. The compound in which R is ethyl and $R_{1-7}$ are hydrogen is of particular advantage as a tranquilizer.

The terms "lower alkyl," "lower alkanoyl" or "lower alkoxy" are used herein to indicate moieties with not more than 4 carbon atoms preferably containing methyl and ethyl radicals. Whenever basic or acidic producing moieties are present in these compounds the corresponding nontoxic, chemically stable and pharmaceutically acceptable salts are included in this invention such as the acid addition salts of an amino substituent or the alkali metal salts preferably sodium and potassium such as those formed at the 1-position of the nucleus.

These indeno(1,2-c)pyrazol-4-one derivatives are prepared most advantageously from 2-acyl-1,3-indandiones by reaction with various molar equivalents of hydrazine. For instance, vigorous reaction of substituted 2-acyl-1,3-indandiones with about one molar equivalent of hydrazine yields the novel cylized intermediates, namely indeno(1,2-c)pyrazol-4-one derivatives of the following structure

FORMULA II

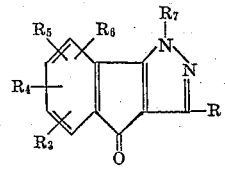

in which R, $R_3$, $R_4$, $R_5$ and $R_6$ are as defined for Formula I and $R_7$ is hydrogen. These compounds are particularly useful when R is lower alkyl of 1 to 8 carbon atoms and $R_3$, $R_4$, $R_5$, $R_6$ and $R_7$ are hydrogen.

For instance, substantially equivalent molar quantities of the 2-acylindandione and hydrazine are reacted at elevated temperatures, such as from about 40° C. to 130° C., for a reaction period of from about 30 minutes to 72 hours in a suitable solvent in which the reactants are substantially soluble and with which no chemical reaction occurs. Normally, the solvent is a polar organic solvent such as the preferred lower alcohols especially methanol and ethanol or mixtures thereof. Alternatively, however, benzene, tetrahydrofuran, toluene, xylene and other such solvents can be used. The hydrazine reactant may be either as the hydrate or the pure hydrazine. It will be recognized by one skilled in the art that various 2-acyl-1,3-indandiones will cyclize with varying ease. Some indandiones, for instance 2-pivalyl-1,3-indandione, cyclize very readily even at room temperature in fair yields. Others require prolonged forcing of the reaction. The conditions given above, however, have been found to give the desired indeno-(1,2-c)pyrazol-4-ones in good yield over a broad range of compounds.

In many cases smaller amounts of hydrazone impurities are formed as by-products. The reaction mixture is usually worked up by diluting the mixture with water, separating the resulting solid and fractional crystallization.

The compounds in which $R_7$ is acyl, alkyl or aralkyl are preferably prepared by reacting the indeno-(1,2-c) pyrazol-4-one with a basic reagent, preferably an alkali metal or its hydroxide, amide, carbonate or, advantageously hydride, to form the N-metal salt, for instance the preferred sodium, potassium or lithium, derivative at the 1-position. This N-metal derivative is then reacted with a reactive alkyl, aralkyl halide or acyl halide to give the 1-substituted-indeno(1,2-c)pyrazol-4-one analogue of Formula II in which $R_7$ is as defined by Formula I. Alternatively, the parent compound in which $R_6$ is hydrogen can be acylated directly with an alkyl or acyl halide.

The novel end product hydrazones of this invention represented by Formula I are prepared by reacting the intermediate ketones of Formula II (including $R_7$ as substituted or unsubstituted) with hydrazine, either about one equivalent or an excess, at from about 25° C. to 140° C. for from 30 minutes to 72 hours under reaction conditions much like those described hereabove for the formation of the indenopyrazolones. Methanol or ethanol are especially preferred solvents for this reaction in which solubility is often a problem. This two-step reaction is necessary for compounds in which $R_1$, $R_2$, and $R_7$ are substituents other than hydrogen. Other compounds are preferably prepared by reacting the 2-acyl-1,3-indandione with either two moles or an excess of hydrazine under reaction conditions similar to those under which the indenopyrazolones are formed to give the desired 4-hydrazone end products directly. This method is preferred. In these reactions an excess of hydrazine can be used but has little advantage. Also the reaction time can be extended considerably but once again with little advantage.

Many of the 2-acyl-1,3-indandiones which serve as starting materials are known to the art. See, for instance, Kilgore, Ind. Eng. Chem. 34, 494 (1942); Theilacher, Ann. 570, 1 (1950); and Schwerin, Ber. 27, 104 (1894). Others are prepared by synthetic methods similar to those known, for instance condensing a methyl ketone with a dimethyl or diethyl phthalate in an aromatic solvent such as benzene or toluene with an alkaline condensing agent such as sodium methoxide.

The structure of certain of the compounds unsymmetrically substituted in the benzene ring of the indeno-(1,2-c)pyrazole nucleus is uncertain because of the unknown course of the cyclization reaction with these compounds. Also there is some possibility that the 1-substituents may be on the 2-position of the nucleus in certain cases. The compounds which are the objects of this invention, however, have been named in the most logical manner known at this time and all isomers thereof are included in this invention.

It will be apparent to one skilled in the art that many variations of this invention can be practiced. The following examples are designed to teach fully the preparation of the compounds of this invention and are not meant to limit the scope of this invention.

*Example 1*

A suspension of 0.666 mole (15.3 g.) of sodium in 250 ml. of toluene is heated with stirring until the sodium melts. After cooling to room temperature gradually with stirring, the toluene is removed and replaced by 300 ml. of dry benzene. The mixture is stirred while 0.69 mole (22.0 g.) of dried methanol is slowly added. After reflux period of six hours, the excess methanol is removed. A mixture of 0.666 mole (129.2 g.) of dimethyl phthalate and 0.666 mole (100.0 g.) of p-methoxyacetophenone is added over a period of 30 minutes. Distillation of the reaction mixture is continued until the evolution of methanol stops. The mixture is cooled to separate a solid which is then removed and slurried in an aqueous-concentrated hydrochloride acid suspension. The resulting solid is recrystallized from tert-butanol to give 2-p-methoxybenzoyl-1,3-indanedione, M.P. 123–124° C.

A mixture of 0.1 mole (28.1 g.) of the indanedione and 0.1 mole (5.0 g.) of hydrazine hydrate in 500 ml. of methanol is heated at reflux for 72 hours. The solution is cooled and diluted with 2 l. of cold water. The resulting solid is separated to give 3-p-methoxyphenylindeno(1,2-c)-pyrazol-4-one, M.P. 264–265° C.

A mixture of 0.01 mole (2.8 g.) of this ketone and 0.1 mole (3.2 g.) of hydrazine in ethanol is heated at reflux for 72 hours. Cooling separates the desired 3-p-methoxyphenylindeno(1,2-c)pyrazol-4-one, hydrazone.

*Example 2*

A mixture of 2.09 g. of 2-isobutyryl-1,3-indandione, prepared by the procedure of Example 1, M.P. 97° C., and 1.02 g. of anhydrous hydrazine in 100 ml. of anhydrous ethanol is heated at reflux for 45 hours. Cooling separates 3-isopropylindeno(1,2-c)pyrazol-4-one, hydrazone, M.P. 237–238° C. Reaction of 2.09 g. of the indandione with 1 mole equivalent of hydrazine at reflux in ethanol for 1 hour gives the ketone intermediate, M.P. 149–150° C.

*Example 3*

A mixture of 2.0 g. of 2-allylcarbonyl-1,3-indandione and 1.2 g. of hydrazine in 100 ml. of ethanol is heated at reflux for 17 hours. Cooling separates 3-allylindeno-(1,2-c)pyrazol-4-one, hydrazone.

*Example 4*

A mixture of 2.6 g. of 2-phenylacetyl-1,3-indandione, prepared as in Example 1, M.P. 77° C., and 1.25 g. of hydrazine in 250 ml. of ethanol is heated at reflux for 65 hours. Cooling separates 3-benzylindeno(1,2-c)pyrazol-4-one, hydrazone, M.P. 263–264° C.

*Example 5*

A suspension of 7.65 g. of sodium in 250 ml. of benzene is reacted with 11 g. of methanol, 84.4 g. of 4-chloroacetophenone and 63 g. of dimethyl phthalate as in Example 1 to give the solid 2-p-chlorobenzoyl-1,3-indandione. A mixture of 2.8 g. of the dione and 0.75 g. of hydrazine in 500 ml. of benzene is heated at reflux for 72 hours. Cooling and filtration of the reaction mixture gives 3-p-chlorophenylindeno(1,2-c)pyrazol - 4-one, hydrazone.

*Example 6*

A solution of 6.9 g. of α-pivalyl-1,3-indandione, and 1.5 g. of hydrazine hydrate in 150 ml. of methanol is heated at reflux for 48 hours. The solution is cooled and diluted with 1 l. of cold water. The resulting solid is 3-tertbutylindeno(1,2-c)pyrazol-4-one, M.P. 198–199° C.

A mixture of 2.3 g. of the pyrazolone and 5 g. of hydrazine hydrate in 350 ml. of ethanol are heated at reflux for 72 hours. The solution is filtered to give the desired 4-hydrazone.

*Example 7*

A mixture of 1.58 g. of 3-tertbutylindeno(1,2-c)-pyrazol-4-one in 50 ml. of 10% aqueous sodium hydroxide is heated at 80° C. for 3 minutes. The filtered solution is cooled to give the yellow sodium salt, M.P. >340° C.

A mixture of 0.5 g. of the sodium salt and 1 ml. of ethyl chloroformate in 10 ml. of ethanol is heated at reflux for 15 minutes. The volatiles are evaporated to leave a yellow fluorescent compound, 1-carbethoxy-3-tert-butylindeno(1,2-c)pyrazol-4-one, M.P. 148–149° C. In similar fashion 1-benzoyl-3-tertbutylindeno(1,2-c)pyrazol-4-one, M.P. 101–102° C., is prepared. Both of these ketones are then reacted with an excess of hydrazine to form the respective hydrazones as in Example 6.

*Example 8*

A mixture of 3.0 g. of 3-p-methoxyphenylindeno-(1,2-c)pyrazol-4-one in 75 ml. of 10% aqueous sodium hydroxide is warmed very briefly. The sodium salt separates. A mixture of 1.0 g. of this salt and a large excess of ethyl bromide in 20 ml. of ethanol is heated at reflux for 5 hours. The volatiles are removed to leave a yellow fluorescent compound, 1-ethyl-3-p-methoxyphenylindeno-(1,2-c)pyrazol-4-one, M.P. 156–157° C. This compound, 2 g., is heated with 1.5 g. of hydrazine hydrate in 100 ml. of methanol for 72 hours to separate the hydrazone of the 1-ethyl compound.

Similarly, a mixture of 0.7 g. of benzenesulfonyl chloride and 1.0 g. of the sodium salt in 30 ml. of ether is reacted to give fluorescent needles of 1-benzenesulfonyl-3-p-methoxyphenylindeno(1,2-c)pyrazol-4-one, M.P. 223–226° C. Also 0.36 g. of methyl chloroformate and 1.0 g. of the sodium salt in 20 ml. of ether gives the solid 1-carbomethoxy-3-p-methoxyphenylindeno(1,2 - c)pyrazol-4-one. Both of these compounds (1 g.) are reacted with 1 g. of hydrazine in ethanol at reflux as in Example 1 to give the respective hydrazones.

*Examples 9*

A mixture of 3.1 g. of 5-bromo-2-isovaleroyl-1,3-indandione and 0.5 g. of hydrazine hydrate in 200 ml. of ethanol is heated at reflux for 3 hours. The solution is quenched to yield monobromo-3-isobutylindeno(1,2-c)-pyrazol-4-one.

This crude ketone (2.7 g.) is reacted with an excess of hydrazine (2 g.) in methanol at reflux for 24 hours to give the hydrazone.

*Example 10*

A mixture of 3.2 g. of 2-isobutyryl-4,5,6,7-tetrachloro-1,3-indandione, prepared from the sodium methoxide condensation of ethyl tetrachlorophthalate and methyl isopropyl ketone, and 0.5 g. of hydrazine hydrate in 150 ml. of ethanol is heated at reflux for 16 hours. The solution is diluted with water to yield 3-isopropyl-5,6,7,8-tetrachloroindeno(1,2-c)pyrazol-4-one.

The ketone (2.2 g.) is heated in ethanol with 1 g. of hydrazine to give the hydrazone derivative.

*Example 11*

A solution of 1.8 g. of 2-acetyl-1,3-indandione and 0.5 g. of hydrazine hydrate in ethanol is heated at reflux for 1 hour. Quenching the reaction mixture gives a solid, 3-methylindeno(1,2-c)pyrazol-4-one.

This compound (1.8 g.) is reacted with 0.75 g. of hydrazine in methanol for 16 hours to give the 4-hydrazone, M.P. 250–255° C.

The keto compound (0.9 g.) is reacted with 0.5 g. of unsymmetrical dimethylhydrazine in 100 ml. of ethanol at reflux for 6 hours to give the 4-N,N-dimethylhydrazone.

*Example 12*

A solution of 5.0 g. of 2-benzoyl-1,3-indandione, M.P. 109–110° C., and 1 g. of hydrazine hydrate in 200 ml. of ethanol is heated at reflux for 24 hours. Quenching gives a solid, 3-phenylindeno(1,2-c)pyrazol-4-one, M.P. 254–255° C.

This ketone (1.5 g.) is reacted with 1 g. of phenyl hydrazine in 150 ml. of ethanol at reflux for 72 hours to give the 4-phenylhydrazone. The ketone (0.75 g.) is reacted with an excess of hydrazine in ethanol to give the 4-hydrazone.

*Example 13*

A solution of 3.2 g. of 2-isobutyryl-4-ethoxy-5-methoxy-7-nitro-1,3-indandione, prepared by condensation of ethyl 3-ethoxy-4-methoxy-6-nitrophthalate with methyl isopropyl ketone as in Example 1, and 2.5 g. of hydrazine in 200 ml. of ethanol is heated at reflux for 72 hours. The reaction mixture is diluted with water to give 8-ethoxy-7-methoxy-3-isopropyl - 5 - nitroindeno(1,2-c)-pyrazol-4-one hydrazone.

*Example 14*

A solution of 1.0 g. of 3-methylindeno(1,2-c)pyrazol-4-one, N,N-dimethylhydrazone in 200 ml. of ether-tetrahydrofuran is reacted with an equivalent amount of potassiumhydride. The potassium salt is separated by filtration. This compound, 0.9 g., is then reacted with an excess of benzyl chloride in ethanol to form 1-benzyl-3-methylindeno(1,2-c)pyrazol-4-one, N,N-dimethylhydrazone.

*Example 15*

A solution of 4.5 g. of 2-senecioyl-1,3-indandione, M.P. 135° C., and 0.65 g. of hydrazine in 200 ml. of methanol is heated at reflux for 5 hours. The solution is worked up as in Example 1 to obtain 3-dimethylvinylindeno-(1,2-c)pyrazol-4-one. The ketone, 0.5 g., is heated at reflux for 12 hours with hydrazine in ethanol to give the hydrazone.

*Example 16*

A solution of 5.0 g. of 4,5-dimethyl-2-isobutyryl-1,3-indandione, prepared by condensing methyl 3,4-dimethylphthalate with methyl isopropyl ketone, and 1.0 g. of hydrazine in 250 ml. of ethanol is heated at reflux for 10 hours. Working up as in Example 1 gives 5,6-dimethyl - 3 - isopropylindeno(1,2-c)pyrazol-4-one. This compound is reacted with an excess of hydrazine to give the hydrazone derivative as described in Example 1.

*Example 17*

A solution of 7.5 g. of 4-bromo-5-hydroxy-6-methoxy-2-benzoyl-1,3-indandione, prepared by condensing methyl 3-bromo-4-hydroxy - 5 - methoxyphthalate with acetophenone, in 500 ml. of ethanol is heated at reflux with an excess of hydrazine for 16 hours. After working up as in Example 1, 5-bromo-6-hydroxy-7-methoxy-3-phenylindeno(1,2-c)pyrazol-4-one and its hydrazone are obtained.

*Example 18*

A solution of 4.8 g. of 4,7-dimethoxy-2-p-ethoxybenzoyl-1,3-indandione, prepared by condensing ethyl 3,6-dimethoxyphthalate with p-ethoxyacetophenone, and 3.5 g. of hydrazine hydrate in 450 ml. of methanol is heated at reflux for 72 hours. Quenching separates the desired hydrazone of 3-p-ethoxyphenyl-5,8-dimethoxyindeno(1,2-c)-pyrazol-4-one.

*Example 19*

A solution of 5.1 g. of 2-hexahydrobenzoyl-1,3-indandione, M.P. 77° C., and 0.65 g. of hydrazine in 250 ml. of methanol is heated at reflux for 14 hours to give, after isolation as in Example 1, 3-cyclohexylindeno(1,2-c)pyrazol-4-one. The hydrazone derivative of this ketone is prepared by heating with one equivalent of hydrazine in ethanol for 24 hours.

*Example 20*

A mixture of 3.1 g. of 2-nonanoyl-5-nitro-1,3-indandione, prepared by condensing methyl 4-nitrophthalate with octyl methyl ketone, and 0.32 g. of hydrazine in 150 ml. of ethanol is heated at reflux in ethanol for 6 hours to form 3-octyl-6-nitroindeno(1,2-c)pyrazol-4-one. This ketone is heated for 36 hours in 150 ml. of methanol with an excess, 3 g., of unsymmetrical diethylhydrazine to form the diethylhydrazone derivative.

*Example 21*

A mixture of 3.9 g. of 2-p-methylbenzoyl-5-methyl-1,3-indandione, prepared by condensing methyl 4-methylphthalate with p-methylacetophenone, is heated with 6 g. of hydrazine in 200 ml. of ethanol for 72 hours. The resulting solid is 3-p-methylphenyl-6-methylindeno(1,2-c)pyrazol-4-one hydrazone.

*Example 22*

A mixture of 11.1 g. of 5-chloro-2-acetyl-1,3-indandione and 2.5 g. of hydrazine hydrate in 500 ml. of methanol is heated at reflux for 6 hours to give 6-chloro-3-methylindeno(1,2-c)pyrazol-4-one. About 5 g. of this ketone is converted into the potassium salt by heating with 100 ml. of 5% potassium hydroxide. The resulting potassium salt (1.0 g.) is reacted with 2 ml. of acetyl chloride in ether suspension to give the 1-acetyl derivative. This compound (500 mg.) is reacted with an excess of hydrazine at reflux in methanol for 4 hours to give 1-acetyl-6-chloro-3-methylindeno(1,2-c)pyrazol-4-one hydrazone.

The 6-chloro - 3 - methylindeno(1,2-c)pyrazol-4-one(1 g.) is reacted with 5 g. of hydrazine in 75 ml. of ethanol to give the hydrazone derivative.

*Example 23*

A mixture of 3.4 g. of 2-isobutyryl-5-iodo-1,3-indandione and 1.5 g. of hydrazine in 250 ml. of ethanol is heated at reflux for 1 hour. The reaction mixture is quenched and the resulting solid fractionally recrystallized to give 3-isopropyl-6-iodoindeno(1,2-c)pyrazol-4-one hydrazone.

Example 24

A mixture of 2.7 g. of 5-butyl-2-isobutyryl-1,3-indandione and 0.5 g. of hydrazine hydrate in 150 ml. of ethanol is heated at reflux for several hours to give 6-butyl-3-isopropylindeno(1,2-c)pyrazol-4-one. This ketone (1 g.) is reacted with an excess of hydrazine as in Example 1 to give the hydrazone. Also brief heating in alcohol with dinitrophenylhydrazine gives the corresponding hydrazone derivative.

Example 25

A mixture of 3.0 g. of 3-octyl-6-nitroindeno(1,2-c)pyrazol-4-one, prepared as in Example 20, in 10 ml. of pyridine and a solution of 3 equivalents of sodium hydrosulfite in 10 ml. of water is heated at reflux for about 30 minutes. The mixture is quenched and extracted to give the solid 2-octyl-6-aminoindeno(1,2-c)pyrazol-4-one. This crude material is dissolved in 100 ml. of ethanol and heated at reflux with 1.1 equivalents of hydrazine for 4 hours to form the 4-hydrazone.

Example 26

A mixture of 3.2 g. of 2-propionyl-5-hydroxy-1,3-indandione, prepared as below, and 2.2 equivalents of 95% anhydrous hydrazine in 200 ml. of anhydrous benzene is heated at reflux for 18 hours. The resulting solid is 3-ethyl-6-hydroxyindeno(1,2-c)pyrazol-4-one hydrazone.

A mixture of molar equivalent quantities of dimethyl 4-acetoxyphthalate and methyl ethyl ketone in benzene with a sodium hydride suspension condensing agent is reacted and worked up as in Example 1 to give crude 2-propionyl-5-acetoxy-1,3-indandione. This solid is slurried with 15% aqueous hydrochloric acid to remove the O-acetyl group. Recrystallization of the resulting solid from aqueous ethanol gives 2-propionyl-5-hydroxy-1,3-indandione.

Example 27

A mixture of 20.2 g. of 2-propionyl-1,3-indandione, M.P. 102° C., and 3.4 g. of hydrazine in 750 ml. of ethanol is heated at reflux for two hours. Working up as in Example 1 yields 3-ethylindeno(1,2-c)pyrazol-4-one.

This compound (2.4 g.) and 3.5 g. of hydrazine in 100 ml. of ethanol is heated at reflux for 1 hour. The product isolated as in Example 1 is the 4-hydrazone, M.P. 263–264° C.

Example 28

A mixture of 2.4 g. of 2-hexanoyl-1,3-indandione, M.P. 39° C., and 1 g. of hydrazine in 150 ml. of methanol is heated at reflux for 36 hours to give 3-pentylindeno(1,2-c)pyrazol-4-one hydrazone.

Example 29

A mixture of 2.3 g. of 4-methoxy-2-propionyl-1,3-indandione and 1 g. of hydrazine in 100 ml. of ethanol is heated at reflux for 24 hours to give a mixture of 5-methoxy and 8-methoxy-3-ethylindeno(1,2-c)pyrazol-4-one hydrazones separable by fractional crystallization from tertbutanol.

Example 30

A mixture of 3.2 g. of 2-o-ethoxybenzoyl-5-hydroxy-6-methoxy-1,3-indandione, prepared by condensing methyl 4-acetoxy-5-methoxyphthalate with o-ethoxyacetophenone as in Example 26, and 4.5 g. of hydrazine in 200 ml. of ethanol is heated at reflux for 16 hours to give 3-o-ethoxyphenyl-6-hydroxy-7-methoxyindeno(1,2-c)pyrazol-4-one hydrazone.

Example 31

A solution 2.1 g. of 2-propionyl-4,6-dimethoxy-1,3-indandione and 1.5 g. of hydrazine in 150 ml. of ethanol is heated at reflux to give the desired hydrazone of 2-ethyl-5,7-dimethoxyindeno(1,2-c)pyrazol-4-one.

Example 32

A mixture of sodium methoxide, prepared from 6 g. of sodium, 50 g. of methyl phthalate and 35 g. of p-aminoacetophenone in 120 ml. of benzene is reacted at distillation temperature. The methanol distilled is replaced by benzene. The mixture is cooled to give a yellow orange salt which is slurried in 22 ml. of concentrated hydrochloric acid and 400 ml. of water to give 2-p-aminobenzoyl-1,3-indandione.

This compound, 23 g., is heated at reflux with 7 ml. of anhydrous hydrazine in 2.5 l. of ethanol for 5 days with stirring. The resulting solid is recrystallized from methanol 3-p-aminophenylindeno(1,2-c)pyrazol-4-one hydrazone.

What is claimed is:

1. A chemical compound having the following formula:

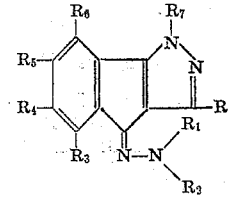

in which R is a member selected from the group consisting of alkyl having 1 to 8 carbon atoms, alkenyl having 2 to 8 carbon atoms, benzyl, phenethyl, phenyl, aminophenyl, halophenyl, lower alkyl phenyl and lower alkoxy phenyl; $R_1$ and $R_2$ are members selected from the group consisting of hydrogen, lower alkyl and, when taken together with the nitrogen to which they are attached, monophenylamino; $R_3$ is a member selected from the group consisting of hydrogen, halogen, nitro of a mononitro compound, lower alkyl and lower alkoxy; $R_4$ and $R_5$ are members selected from the group consisting of hydrogen, halogen, lower alkoxy, lower alkyl, nitro of a mononitro compound, amino and hydroxy; $R_6$ is a member selected from the group consisting of hydrogen, halogen of a tetrahalogen ring and lower alkoxy; and $R_7$ is a member selected from the group consisting of alkyl having 1 to 8 carbon atoms, hydrogen, benzyl, phenethyl, benzenesulfonyl, benzoyl, lower alkanoyl and lower alkyloxycarbonyl.

2. A chemical compound having the following formula:

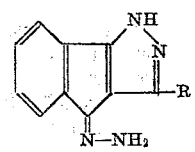

in which R is alkyl having 1 to 8 carbon atoms.

3. 3-tert.-butylindeno(1,2-c)pyrazol-4-one, hydrazone.
4. 3-ethylindeno(1,2-c)pyrazol-4-one, hydrazone.
5. 3-isopropylindeno(1,2-c)pyrazol-4-one, hydrazone.
6. A chemical compound having the following formula:

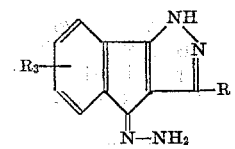

in which R is alkyl having 1 to 8 carbon atoms; and $R_3$ is chloro.

7. A chemical compound having the following formula:

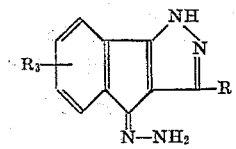

in which R is alkyl having 1 to 8 carbon atoms; and $R_3$ is lower alkoxy.

8. A chemical compound having the following formula:

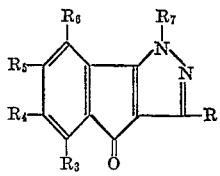

in which R is a member selected from the group consisting of alkyl having 1 to 8 carbon atoms, alkenyl having 2 to 8 carbon atoms, benzyl, phenethyl, phenyl, aminophenyl, halophenyl, lower alkyl phenyl and lower alkoxy phenyl; $R_3$ is a member selected from the group consisting of hydrogen, halogen, nitro of a mononitro compound, lower alkyl and lower alkoxy; $R_4$ and $R_5$ are members selected from the group consisting of hydrogen, halogen, lower alkoxy, lower alkyl, nitro of a mononitro compound, amino and hydroxy; $R_6$ is a member selected from the group consisting of hydrogen, halogen of a tetrahalogen ring and lower alkoxy; and $R_7$ is a member selected from the group consisting of alkyl having 1 to 8 carbon atoms, hydrogen, benzyl, phenethyl, benzenesulfonyl, benzoyl, lower alkanoyl and lower alkyloxycarbonyl.

9. A chemical compound having the following formula:

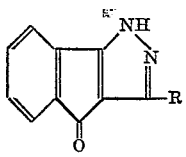

in which R is alkyl having 1 to 8 carbon atoms.

10. 3-ethylindeno(1,2-c)pyrazol-4-one.
11. 3-isopropylindeno(1,2-c)pyrazol-4-one.
12. A chemical compound having the following formula:

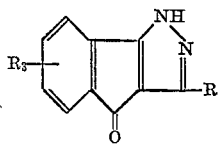

in which R is alkyl having 1 to 8 carbon atoms; and $R_3$ is chloro.

13. The process of preparing indeno(1,2-c)pyrazolone hydrazones having the following formula:

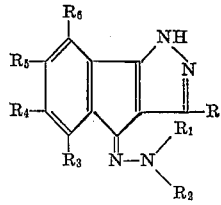

in which R is a member selected from the group consisting of alkyl having 1 to 8 carbon atoms, alkenyl having 2 to 8 carbon atoms, benzyl, phenethyl, phenyl, aminophenyl, halophenyl, lower alkyl phenyl and lower alkoxy phenyl; $R_1$ and $R_2$ are members selected from the group consisting of hydrogen, lower alkyl and, when taken together with the nitrogen to which they are attached, monophenylamino; $R_3$ is a member selected from the group consisting of hydrogen, halogen, nitro of a mononitro compound, lower alkyl and lower alkoxy; $R_4$ and $R_5$ are members selected from the group consisting of hydrogen, halogen, lower alkoxy, lower alkyl, nitro of a mononitro compound, amino and hydroxy; $R_6$ is a member selected from the group consisting of hydrogen, halogen of a tetrahalogen ring and lower alkoxy which comprises reacting a 2-acyl-1,3-indandione with about one molar equivalent of hydrazine to form an indeno(1,2-c)pyrazolone having the following formula:

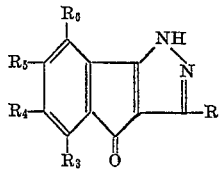

in which R, $R_3$, $R_4$, $R_5$ and $R_6$ are as defined hereabove; and reacting the said indeno(1,2-c)pyrazolone with at least one molar equivalent of a hydrazine having the following formula:

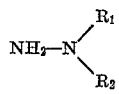

in which $R_1$ and $R_2$ are as defined hereabove.

14. The process of claim 13 in which R is alkyl having 1 to 8 carbon atoms and $R_1$, $R_2$, $R_3$, $R_4$, $R_5$ and $R_6$ are hydrogen.

No references cited.